United States Patent
Liang et al.

(10) Patent No.: US 9,742,331 B2
(45) Date of Patent: Aug. 22, 2017

(54) DOUBLY-FED, VARIABLE-SPEED, DUAL-VOLTAGE AC GENERATION AND DISTRIBUTION SYSTEMS

(71) Applicant: ABB Technology AG, Zurich (CH)

(72) Inventors: Jiaqi Liang, Cary, NC (US); Zhiguo Pan, Cary, NC (US); Li Qi, Cary, NC (US); Anil Kondabathini, Apex, NC (US)

(73) Assignee: ABB Schweiz AG, Baden (CH)

( * ) Notice: Subject to any disclaimer, the term of this patent is extended or adjusted under 35 U.S.C. 154(b) by 11 days.

(21) Appl. No.: 14/856,012

(22) Filed: Sep. 16, 2015

(65) Prior Publication Data

US 2016/0079898 A1  Mar. 17, 2016

Related U.S. Application Data

(60) Provisional application No. 62/051,401, filed on Sep. 17, 2014.

(51) Int. Cl.
*H02K 7/18* (2006.01)
*F02B 63/04* (2006.01)
*H02P 9/00* (2006.01)

(52) U.S. Cl.
CPC ................... *H02P 9/007* (2013.01)

(58) Field of Classification Search
CPC ... H02M 3/3353; H02P 2207/073; H02J 3/00; H02J 13/00
USPC .............. 290/1 R, 4 R, 4 B; 322/90; 307/9.1
See application file for complete search history.

(56) References Cited

U.S. PATENT DOCUMENTS

| | | | |
|---|---|---|---|
| 4,816,696 A | 3/1989 | Sakayori et al. | |
| 4,994,684 A | 2/1991 | Lauw et al. | |
| 5,798,631 A * | 8/1998 | Spee ..................... | F03D 7/0272 290/31 |
| 6,333,622 B1 * | 12/2001 | Fogarty .................... | H02P 9/08 322/59 |

(Continued)

OTHER PUBLICATIONS

Lee, Joon-Hwan et al., "Variable-Speed Engine Generator With Supercapacitor: Isolated Power Generation System and Fuel Efficiency", IEEE Transactions on Industry Applications, vol. 45, No. 6, Nov./Dec. 2009, 2130-2135.

*Primary Examiner* — Viet Nguyen
*Assistant Examiner* — Thomas Quigley
(74) *Attorney, Agent, or Firm* — Taft Stettinius & Hollister LLP

(57) ABSTRACT

A generation and distribution system includes an adjustable-speed prime mover and a doubly-fed asynchronous alternating-current (AC) generator driven by the prime mover and having a first poly-phase circuit, e.g., a stator, and a second poly-phase circuit, e.g., a rotor. The system further includes a first AC bus electrically coupled to the first poly-phase circuit configured to deliver AC power at a first AC voltage to multiple loads, and a second AC bus connected to the second poly-phase circuit configured to deliver AC power at a second AC voltage to another group of loads, the second AC voltage being lower than the first. The system includes a poly-phase transformer having first windings electrically coupled to the first AC bus and having second windings electrically coupled to the second AC bus, and a poly-phase AC-to-AC electronic converter circuit electrically coupled between the second poly-phase circuit and the second AC bus.

15 Claims, 5 Drawing Sheets

(56) References Cited

U.S. PATENT DOCUMENTS

| | | | | |
|---|---|---|---|---|
| 6,420,795 B1* | 7/2002 | Mikhail | | H02P 9/42 290/44 |
| 7,330,012 B2* | 2/2008 | Ahmad | | B60L 1/003 180/165 |
| 7,692,335 B2* | 4/2010 | Michalko | | H02K 7/003 307/84 |
| 8,295,950 B1 | 10/2012 | Wordsworth | | B60H 1/00428 307/86 |
| 8,854,015 B2* | 10/2014 | Deng | | H02P 9/00 290/44 |
| 2002/0079706 A1* | 6/2002 | Rebsdorf | | F03D 9/003 290/55 |
| 2006/0061213 A1* | 3/2006 | Michalko | | H02J 4/00 307/9.1 |
| 2006/0109701 A1* | 5/2006 | Morcov | | H02J 3/34 363/148 |
| 2007/0052244 A1* | 3/2007 | Hudson | | F03D 7/0272 290/44 |
| 2007/0063677 A1* | 3/2007 | Schauder | | H02P 9/42 322/29 |
| 2007/0216164 A1* | 9/2007 | Rivas | | F03D 7/0224 290/44 |
| 2008/0103632 A1* | 5/2008 | Saban | | H02K 3/28 700/286 |
| 2008/0164697 A1* | 7/2008 | Schram | | F03D 7/02 290/44 |
| 2010/0133816 A1* | 6/2010 | Abolhassani | | H02K 3/28 290/44 |
| 2010/0283318 A1* | 11/2010 | Crane | | B63H 23/24 307/9.1 |
| 2011/0084670 A1* | 4/2011 | Childs | | H02P 25/22 322/90 |
| 2013/0029543 A1* | 1/2013 | Gjerpe | | B63J 3/00 440/1 |
| 2013/0200691 A1* | 8/2013 | Crane | | B63H 23/24 307/9.1 |
| 2014/0346774 A1* | 11/2014 | Cooper | | F03D 7/02 290/44 |
| 2015/0249416 A1* | 9/2015 | Barker | | H02M 5/42 290/44 |

* cited by examiner

DOUBLY-FED, VARIABLE-SPEED, DUAL-VOLTAGE AC GENERATION AND DISTRIBUTION SYSTEMS

RELATED APPLICATION

This application claims priority to U.S. provisional patent application Ser. No. 62/051,401, filed 17 Sep. 2014.

TECHNICAL FIELD

The present disclosure is generally related to electric power generating systems, and is more particularly related to generator systems having at least two AC distribution buses, at different voltages.

BACKGROUND

Conventional alternating-current (AC) electric power generation and distribution systems for marine application employ fixed-speed AC generation. In these systems, prime movers, e.g. diesel generators, gas turbines, etc., operate at fixed speeds and often not at their optimal-efficiency points. The generators typically output medium voltages (MV) to supply propulsion motor drives, while low voltage (LV) loads, such as drilling equipment, are supplied through MV/LV transformers.

FIG. 1 illustrates an example of a conventional marine AC generation and distribution system, in which four prime movers 110 operate at a fixed speed and are each electrically coupled to an AC generator 120. The AC generators 120 are designed to provide a medium-voltage (MV) AC output, on buses MVAC1 and MVAC2. Several loads, indicated as motors 130 in FIG. 1, are driven by the power supplied by AC generators 120, but generally at lower voltages. Accordingly, several of the motors 130 are electrically coupled to the MV AC buses via AC-to-AC converters 140, which provide a variable-voltage output more suitable for the loads. Likewise, others of the motors 130 are driven from low-voltage (LV) AC buses LVAC1 and LVAC2. These LV AC buses are energized by step-down transformers T1 and T2, which, again, provide a lower-voltage output more suitable for the loads.

Where variable-speed prime movers are used, two variable-speed generation schemes are commonly used to decouple the AC-bus frequency from the prime mover speed. One scheme, illustrated in FIG. 2, uses a fully-rated electronic power converter 215 between the generator 120, which is driven by a variable-speed prime mover 210, and the AC bus. A second scheme, illustrated in FIG. 3, uses a doubly-fed induction generator (DFIG) 310 and a fractionally-rated power electronics converter 325. In this second scheme, an interfacing transformer 335 ($T_{DFIG}$ in FIG. 3) is generally used to reduce the voltage rating of the converter and DFIG rotor brushes.

SUMMARY

Conventional doubly-fed induction generator (DFIG) systems typically require interfacing transformers or fully-rated electronic power converters, which are costly. Further, in a marine system like the one pictured in FIG. 1, the transformers between the medium-voltage (MV) and low-voltage (LV) buses are bulky, particularly if the loads on the LV buses have high power ratings.

Several embodiments of the present invention address these problems. In some of these embodiments, a DFIG generation and distribution system includes a wound-rotor induction generator having its stator connected to a first AC bus, e.g., an MV AC bus and having its rotor connected to one side of a frequency converter. The other side of the frequency converter connects to a second AC bus, e.g., a LV AC bus. The MV AC and LV AC buses are connected to one another through a transformer.

As detailed below, these embodiments can provide several advantages, allowing variable speed operation for prime movers, the use of fractionally-rated power electronics converters, the removal of DFIG rotor-side interfacing transformers, and size and rating reductions of main MV/LV transformers, if the LV load has high power rating. These embodiments are particularly useful in marine vessel power generation and distribution systems.

One example embodiment of the present invention is an electric generation and distribution system that comprises a prime mover configured for adjustable speed operation and a doubly-fed asynchronous alternating-current (AC) generator driven by the prime mover and having a first poly-phase circuit, e.g., a stator, and a second poly-phase circuit, e.g., a rotor. The doubly-fed asynchronous AC generator could be a wound-rotor induction generator with slip rings, for example, or a wound-rotor induction generator with brushless excitation. The example system further includes a first AC distribution bus electrically coupled to the first poly-phase circuit and configured to deliver AC power at a first AC voltage to multiple loads, as well as a second AC distribution bus configured to deliver AC power at a second AC voltage to another group of loads, the second AC voltage being lower than the first AC voltage. Finally, the example system includes a poly-phase transformer having first windings electrically coupled to the first poly-phase circuit and the first AC distribution bus and having second windings electrically coupled to the second AC distribution bus, as well as a poly-phase AC-to-AC electronic converter circuit electrically coupled between the second poly-phase circuit and the second AC distribution bus.

In some cases, the AC-to-AC electronic converter circuit electric in the generation and distribution system described above is an indirect converter comprising a poly-phase AC-to-DC converter, a poly-phase DC-to-AC converter, and a DC link between the poly-phase AC-to-DC converter and the poly-phase DC-to-AC converter. In some of these and in some other embodiments, the AC-to-AC electronic converter circuit is configured to convert AC power between a variable-voltage, variable-frequency, AC voltage at the second poly-phase circuit and a substantially fixed frequency AC voltage at the second AC distribution bus.

The system described above may include multiple prime movers and generators. Thus, for example, the system may include a second prime mover configured for adjustable speed operation and a second doubly-fed asynchronous alternating-current (AC) generator driven by the second prime mover and having a third poly-phase circuit electrically coupled to the first AC distribution bus and a fourth poly-phase circuit. A second poly-phase AC-to-AC converter circuit is electrically coupled between the fourth poly-phase circuit and the second AC distribution bus.

Methods for configuring and operating electric generation and distributions systems like those described above are detailed herein. In an example method of configuring an electric generation and distribution system, a prime mover is configured for driving a doubly-fed asynchronous alternating current (AC) generator, the doubly-fed asynchronous AC generator having a first poly-phase circuit and a second poly-phase circuit. A first AC distribution bus is electrically coupled to the first poly-phase circuit and to a first set of loads, so as to deliver AC power at a first AC voltage to the first set of loads. A second AC distribution bus is electrically coupled to a second group of loads, so as to deliver AC power at a second AC voltage to the second group of loads. First windings of a poly-phase transformer are electrically coupled to the first poly-phase circuit and to the first AC distribution bus, while second windings of the poly-phase transformer are electrically coupled to the second AC distribution bus, so as to deliver AC power at a second AC voltage to the second AC distribution bus, the second AC voltage being lower than the first AC voltage. A poly-phase AC-to-AC electronic converter circuit is electrically coupled between the second poly-phase circuit and the second AC distribution bus. This example method may be modified to accommodate any of the various configurations of the electric generation and distribution systems described herein.

Similarly, an example method of operating an electric generation and distribution system comprises driving a doubly-fed asynchronous alternating current (AC) generator with a prime mover, the doubly-fed asynchronous AC generator having a first poly-phase circuit and a second poly-phase circuit, and coupling AC power from the first poly-phase circuit to a first AC distribution bus, without voltage conversion, and from the first AC distribution bus to a first plurality of loads, so as to deliver AC power at a first AC voltage to the first plurality of loads. The method further comprises converting AC power from the second poly-phase circuit to a second AC voltage, using a poly-phase AC-to-AC electronic converter circuit, and coupling the converted AC power to a second AC distribution bus, where the second AC voltage is lower than the first AC voltage, and transforming AC power from the first poly-phase circuit to the second AC voltage, using a poly-phase transformer having first windings electrically coupled to the first poly-phase circuit and the first AC distribution bus and second windings electrically coupled to the second AC distribution bus. The method further comprises delivering power at the second AC voltage to a second plurality of loads, using the second AC distribution bus. This example method may be modified to accommodate any of the various configurations of the electric generation and distribution systems described herein.

Those skilled in the art will recognize still further embodiments, as well as additional features and advantages of several of these embodiments, upon reading the following detailed description and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings.

DETAILED DESCRIPTION

In the claims and discussion that follow, terms such as "first", "second", and the like, are used to differentiate between several similar elements, regions, sections, etc., and are not intended to imply a particular order or priority unless the context clearly indicates otherwise. Furthermore, as used herein, the terms "having", "containing", "including", "comprising" and the like are open-ended terms that indicate the presence of stated elements or features but that do not preclude additional elements or features. Likewise, the use of the singular articles "a", "an" and "the" are not intended to preclude the presence of additional ones of the referenced item. Like terms refer to like elements throughout the description.

The phrases "electrically coupled to" or "electrically coupling" are used in the following description of the present invention. It should be understood that these phrases can refer to a direct electrical connection as well as to an electrical connection that passes through a protective device, such as a switch or circuit breaker, or through a monitoring device, or through another device that does not substantially modify the voltage or current. One the other hand, it should be understood that these phrases, as used to describe the presently disclosed systems, does not encompass electrical connections that cover large distances, relative to the size of a typical marine generation and distribution system, e.g., distances exceeding hundreds of meters. Similarly, while the figures attached hereto may illustrate direct electrical connections between two or more components, any one or more of these connections may be through a protection device and/or monitoring device, in various applications. Likewise, it should be understood that illustrated protective devices or monitoring devices may be omitted, in some cases.

With regards to the figures, it will be appreciated that several of the figures are schematics that include poly-phase components and connections. While these poly-phase components and connections may typically be three-phase elements, as commonly used in power generation systems, other configurations, such as six-phase or twelve-phase systems, are possible. For simplicity, the figures illustrate many of the multi-phase electrical connections with a single line—it will be appreciated that these connections will actually comprise multiple conductors, e.g., three or four conductors in the case of a three-phase system.

Figure 4:
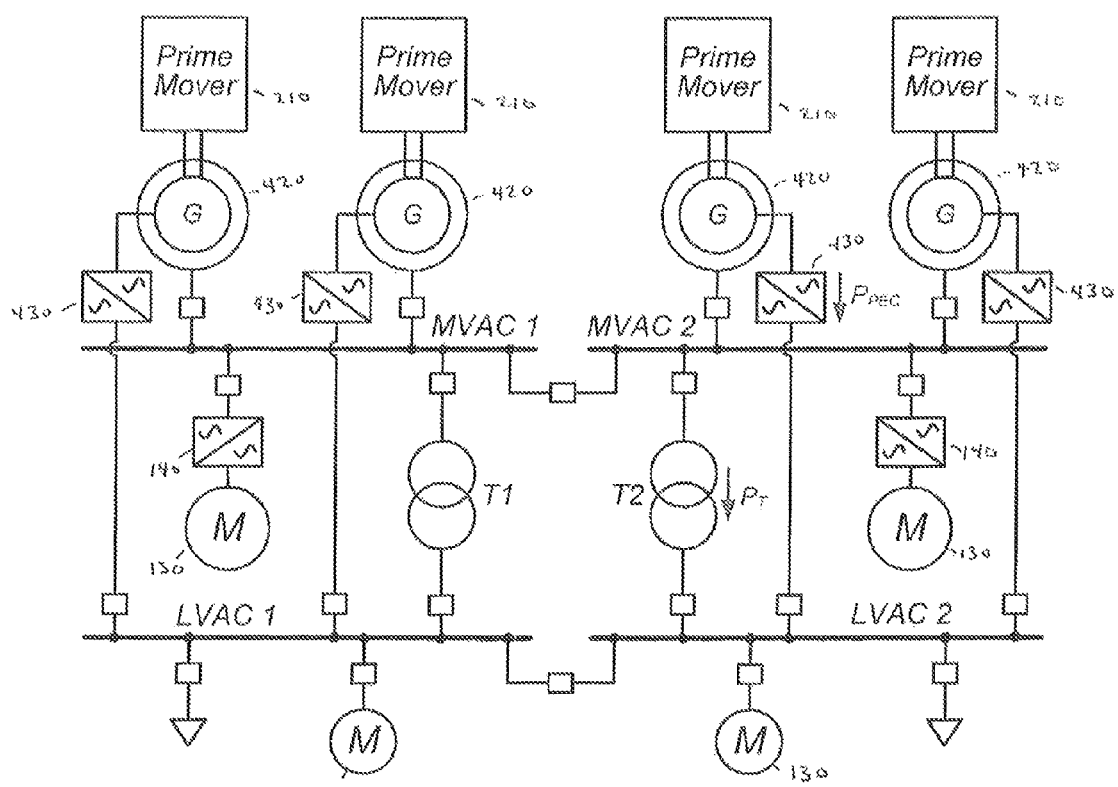
FIG. 4 illustrates a variable-speed AC system for marine vessels, according to some embodiments of the present invention.

FIG. 4 illustrates a variable-speed electric power generation and distribution system that is particularly suitable for marine vessels. Doubly-fed induction generators (DFIGs) 420 and fractionally-rated power electronics converters (PECs) 430 are used to achieve variable-speed operation for the prime movers 210.

Figure 1:
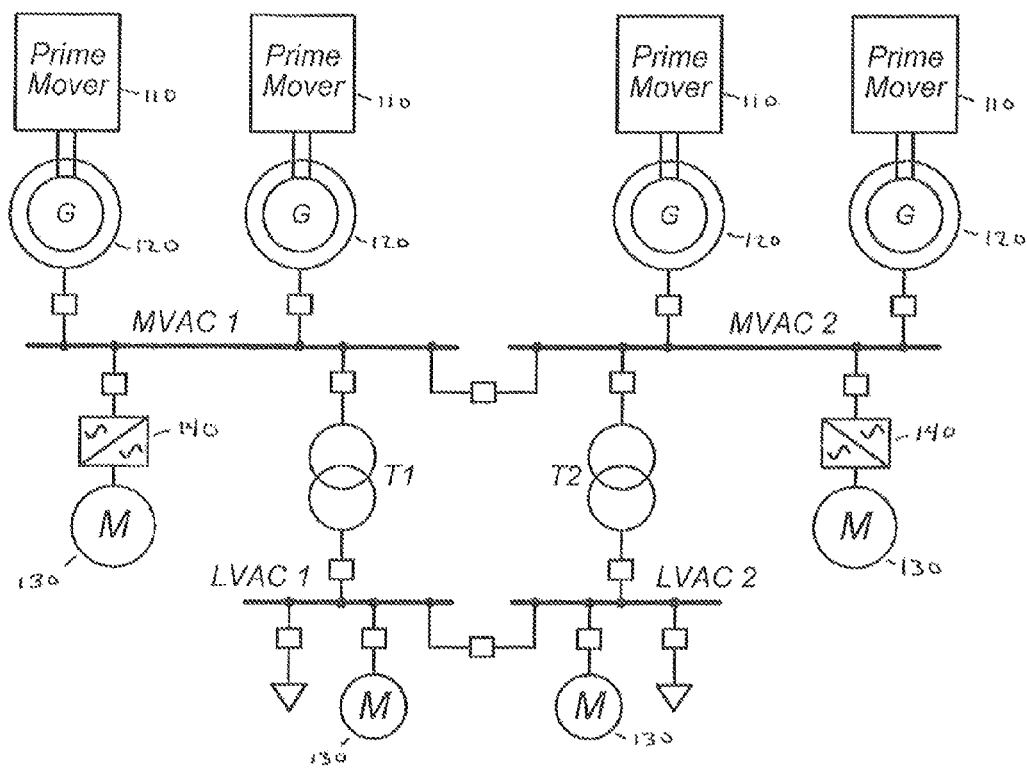
FIG. 1 illustrates a conventional marine AC generation and distribution system.

The example system shown in FIG. 4 can substitute for the conventional system shown in FIG. 1. Several differences between the systems should be apparent. Most notably, the stator terminal of each DFIG 420 is electrically coupled to the MV AC bus, while the rotor terminal is electrically coupled to PEC 430. The other side of PEC 430 is connected to the LV AC bus. As a consequence, rotor-side interfacing transformers (as shown in in FIG. 3) are not needed. Instead, power can flow directly from the rotor of each DFIG 420 to the LV AC bus. This can reduce the overall transformer rating needed for the transformers T1 and T2, as a portion of the power required by the LV loads bypasses these transformers. Also of note is that the DFIGs 420 operate in the same way as they do in a conventional DFIG system, which means that the PECs 430 can have fractional power ratings as well. Thus, the system requires neither fully-rated power converters (as in FIG. 2) nor rotor-side interfacing transformers (as shown in FIG. 3).

As noted above, the power ratings of the main MV/LV transformers (T1 and T2) can be reduced, in many applications. This is possible when the prime movers 110 can operate in the super-synchronous speed mode ($\omega m > \omega s$), which can be achieved by proper mechanical design or higher pole numbers, and in applications where the low-voltage loads have a relatively high power rating, e.g., greater than about 50% of the maximum system load. One example application is drilling ships, where both the MV propulsion load and the LV drilling load have high power ratings, but are not active at the same time.

Figure 2:
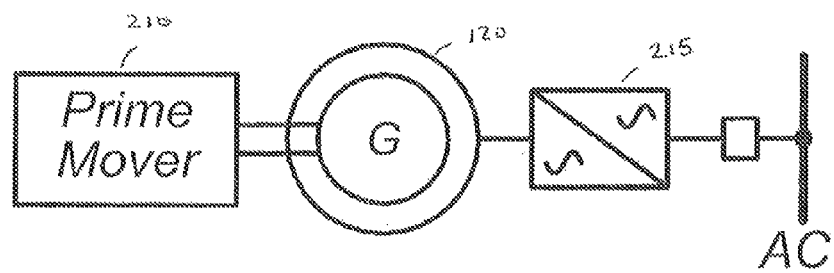
FIG. 2 illustrates variable-speed generation using a fully-rated power electronic converter.

Compared to systems that use generator configurations like the one shown in FIG. 2, i.e., with a fully-rated power converter, the proposed DFIG system uses PECs 430 with lower converter ratings, but with smaller variable speed ranges. The system also allows for lower MV/LV transformer ratings, if the LV load has a high rating.

Figure 3:
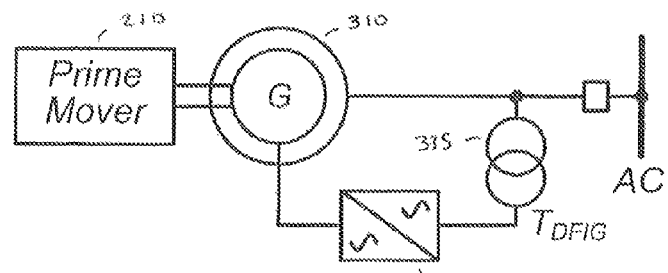
FIG. 3 shows variable-speed generation using a doubly-fed generator and a fractionally-rated electronic power converter.

Compared to systems that use generator configurations like the one shown in FIG. 3, i.e., a conventional DFIG with a rotor-side interfacing transformer, the system of FIG. 4 uses converters having the same fractional-power converter rating and variable speed range, but provides a lower overall transformer count, since there are no DFIG rotor-side interfacing transformers. Further, the system also allows for lower MV/LV transformer ratings, again if the LV load has a high rating.

Another advantage of the system shown in FIG. 4 is that dynamic reactive power compensation can be provided, if necessary, to the LV AC bus through the DFIG converters.

Figure 5:
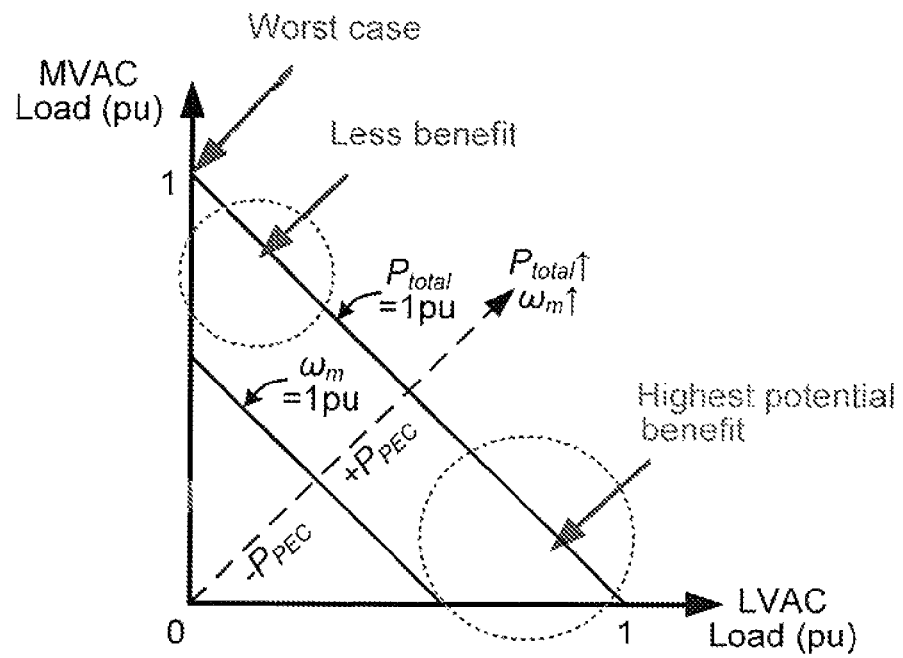
FIG. 5 is a plot showing the operating points (MV AC load versus LV AC load) at which embodiments of the present invention yield the greatest advantages.

As suggested above, the system shown in FIG. 4 only allows for reduced power ratings of the MV/LV transformers if the LV AC load is relatively high. FIG. 5 provides a more complete illustration of where the DFIG AC systems described herein can yield the highest benefits. The y-axis shown in FIG. 5 represents the MV AC load, relative to the total system capability, while the x-axis shows the LV AC load, again relative to the total system capability. At the upper left of the figure, an arrow indicates the "worst case" scenario. Here, where the LV AC load is negligible, compared to the MV AC load, the power ratings for the MV/LV transformers cannot be reduced, compared to systems that use the configuration shown in FIG. 1. At the lower right of the figure, on the other hand, another arrow indicates the "highest potential benefit." Here, where the LV AC load is very high, compared to the MV AC load, the greatest possible reductions in the MV/LV power ratings are possible. Operating points between these two extremes allow for varying potential for reducing the transformer power ratings.

Figure 6:
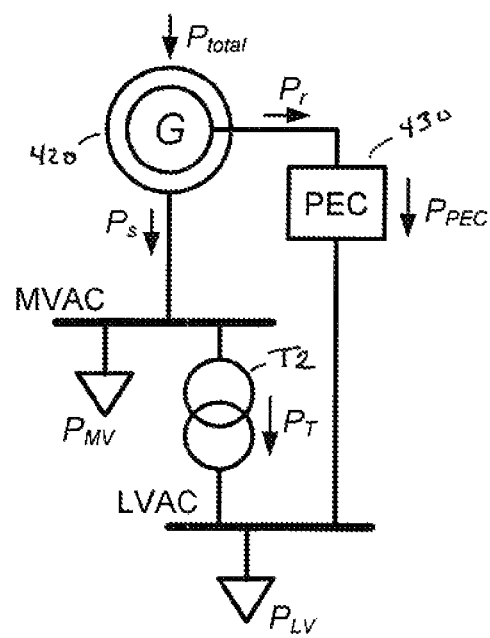
FIG. 6 illustrates a generator configuration, with power flows labeled.

FIG. 6 isolates one of the DFIGs 420 from FIG. 4, and illustrates the power flows from the DFIG 420, into and out of the PEC 430, and through an MV/LV transformer T2. The power flow $P_{PEC}$ through PEC 430 is given by:

$$P_{PEC} = P_r = \frac{\omega_m - 1}{\omega_m} P_{total},$$

where $\omega_m$ is the per-unit speed of the generator rotor, and $P_{total}$ is the power supplied by the prime mover. The power flow $P_T$ through the MV/LV transformer T2 is given by:

$$P_T = P_{LV} - \frac{\omega_m - 1}{\omega_m} P_{total}.$$

This is less than what would be seen if a conventional DFIG configuration (as in FIG. 3) was used, if:

$$\omega_m > 1 \quad \text{if } P_{LV}/P_{total} \geq 0.5$$
$$\frac{1}{(1 - 2P_{LV}/P_{total})} > \omega_m > 1 \quad \text{if } P_{LV}/P_{total} < 0.5.$$

Accordingly, a lower power rating for the MV/LC transformer may be used, if these conditions apply.

It will be appreciated that one potential design challenge for systems of the type shown in FIG. 4 is that the voltages of the DFIG converter must be matched by properly designing the generator turns ratio, since the interfacing transformer is eliminated. Thus:

Voltage rating of converter machine-side terminal=$V_{MV}$*Nr/Ns*MaxSlip, and

Voltage rating of converter system-side terminal=$V_{LV}$.

As seen in FIG. 4 and explained, an improved DFIG generation and system suitable for use in marine systems, for example, includes a wound-rotor induction generator having its stator connected to a first AC bus, e.g., an MV AC bus and having its rotor connected to one side of a frequency converter. The other side of the frequency converter connects to a second AC bus, e.g., a LV AC bus. The MV AC and LV AC buses are connected to one another through a transformer. As was explained above, this system can provide several advantages, allowing variable speed operation for prime movers, the use of fractionally-rated power electronics converters, the removal of DFIG rotor-side interfacing transformers, and size and rating reductions of main MV/LV transformers, if the LV load has high power rating.

More generally, it will be appreciated that an example of the presently disclosed invention is an electric generation and distribution system that comprises a prime mover configured for adjustable speed operation and a doubly-fed asynchronous alternating-current (AC) generator driven by the prime mover and having a first poly-phase circuit, e.g., a stator, and a second poly-phase circuit, e.g., a rotor. While the doubly-fed asynchronous AC generator could be a wound-rotor induction generator with slip rings, for example, it could also be a wound-rotor induction generator with brushless excitation, in which case the rotor winding is not necessary electrically connected to the external power converter. For this reason, the term "poly-phase circuit" is used, rather than "stator" and "rotor."

The example system further includes a first AC distribution bus electrically coupled to the first poly-phase circuit and configured to deliver AC power at a first AC voltage to multiple loads, as well as a second AC distribution bus configured to deliver AC power at a second AC voltage to another group of loads, the second AC voltage being lower than the first AC voltage. Finally, the example system includes a poly-phase transformer having first windings electrically coupled to the first poly-phase circuit and the first AC distribution bus and having second windings electrically coupled to the second AC distribution bus, as well as a poly-phase AC-to-AC electronic converter circuit electrically coupled between the second poly-phase circuit and the second AC distribution bus.

In some cases, the AC-to-AC electronic converter circuit electric in the generation and distribution system described above is an indirect converter comprising a poly-phase AC-to-DC converter, a poly-phase DC-to-AC converter, and a DC link between the poly-phase AC-to-DC converter and the poly-phase DC-to-AC converter. In some of these and in some other embodiments, the AC-to-AC electronic converter circuit is configured to convert AC power between a variable-voltage, variable-frequency, AC voltage at the second poly-phase circuit and a substantially fixed frequency AC voltage at the second AC distribution bus.

The system described above may include multiple prime movers and generators, as shown in FIG. 4. Thus, for example, the system may include a second prime mover configured for adjustable speed operation and a second doubly-fed asynchronous alternating-current (AC) generator driven by the second prime mover and having a third poly-phase circuit electrically coupled to the first AC distribution bus and a fourth poly-phase circuit. A second poly-phase AC-to-AC converter circuit is electrically coupled between the fourth poly-phase circuit and the second AC distribution bus.

Figure 7:
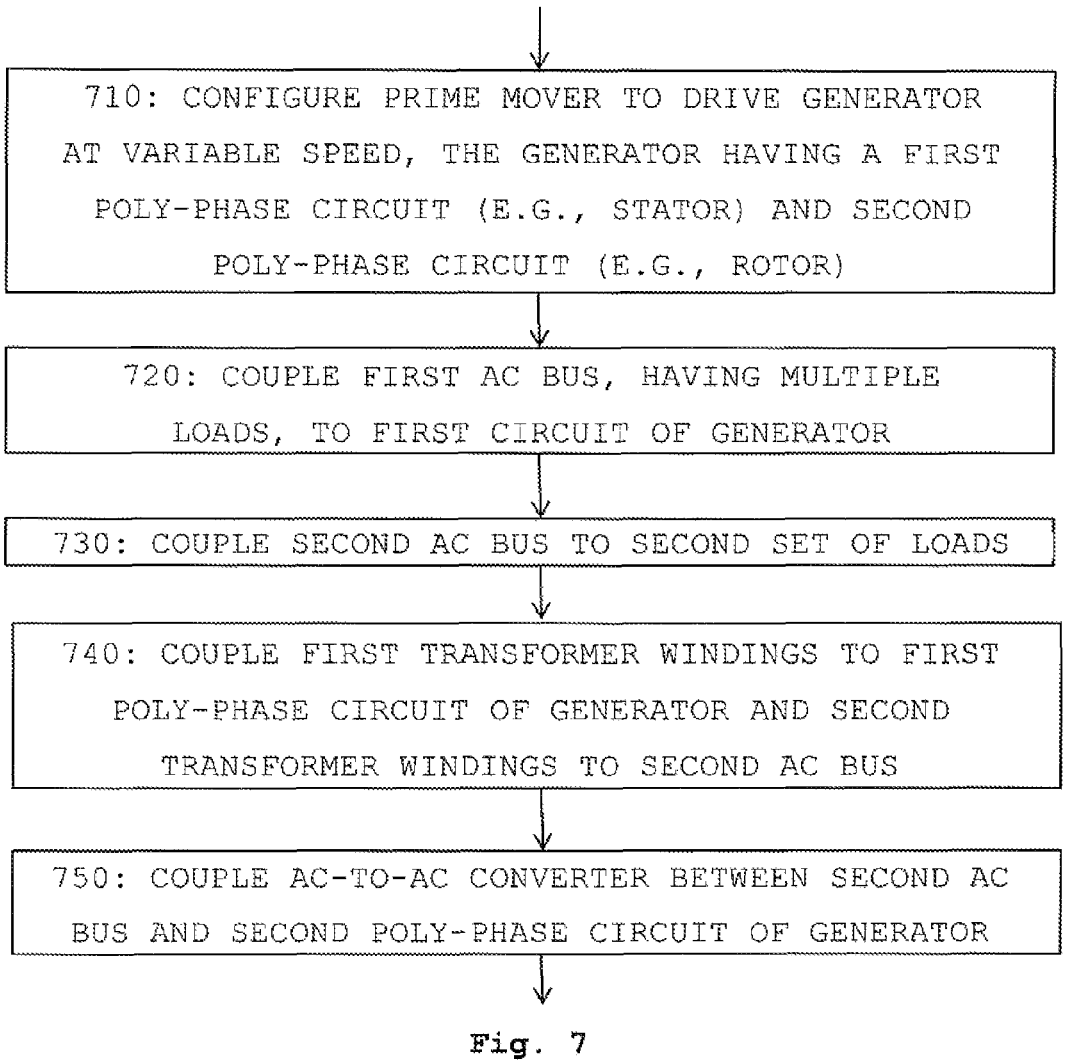
FIG. 7 is a process flow diagram illustrating an example method of configuring an electric generation and distribution system.

The process flow diagram of FIG. 7 illustrates an example method of configuring an electric generation and distribution system according to the inventive techniques detailed above. Note that the illustrated steps are not necessarily carried out in any particular order. As shown at block 710, a prime mover is configured to drive a doubly-fed asynchronous alternating current (AC) generator, the doubly-fed asynchronous AC generator having a first poly-phase circuit and a second poly-phase circuit. The prime mover may drive the AC generator at variable speed, in some embodiments or in some instances. As shown at block 720, a first AC distribution bus is electrically coupled to the first poly-phase circuit and to a first set of loads, so as to deliver AC power at a first AC voltage to the first set of loads. A second AC distribution bus is electrically coupled to a second group of loads, as shown at block 730, so as to deliver AC power at a second AC voltage to the second group of loads. As shown at block 740, first windings of a poly-phase transformer are electrically coupled to the first poly-phase circuit and to the first AC distribution bus, while second windings of the poly-phase transformer are electrically coupled to the second AC distribution bus, so as to deliver AC power at a second AC voltage to the second AC distribution bus. The second AC voltage is lower than the first AC voltage. As shown at block 750, a poly-phase AC-to-AC electronic converter circuit is electrically coupled between the second poly-phase circuit and the second AC distribution bus. It will be appreciated that this example method may be modified to accommodate any of the various configurations of the electric generation and distribution systems described herein.

Figure 8:
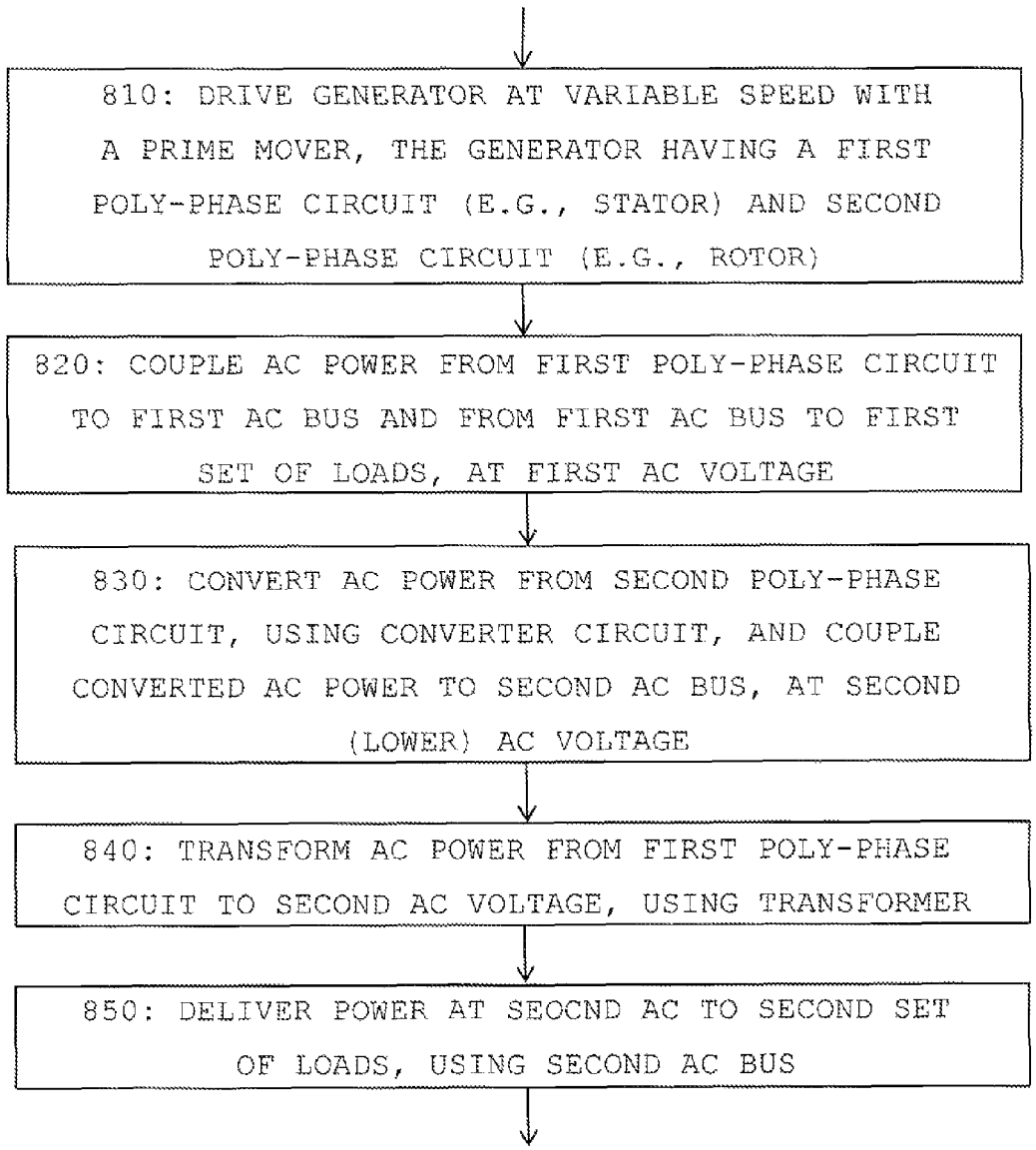
FIG. 8 is a process flow diagram illustrating an example method of operating an electric generation and distribution system.

FIG. 8 is a process flow diagram illustrating an example method of operating an electric generation and distribution system. It will be appreciated that the illustrated operations are carried out simultaneously, so the figure should not be understood as implying a particular order. As shown at block 810, the method comprises driving a doubly-fed asynchronous alternating current (AC) generator with a prime mover, the doubly-fed asynchronous AC generator having a first poly-phase circuit and a second poly-phase circuit. The AC generator may be driven at variable speed, in some embodiments or instances. As shown at block 820, the method further includes coupling AC power from the first poly-phase circuit to a first AC distribution bus, without voltage conversion, and from the first AC distribution bus to a first plurality of loads, so as to deliver AC power at a first AC voltage to the first plurality of loads. As seen at block 830, the method further comprises converting AC power from the second poly-phase circuit to a second AC voltage, using a poly-phase AC-to-AC electronic converter circuit, and coupling the converted AC power to a second AC distribution bus, where the second AC voltage is lower than the first AC voltage. As shown at block 840, AC power from the first poly-phase circuit is transformed to the second AC voltage, using a poly-phase transformer having first windings electrically coupled to the first poly-phase circuit and the first AC distribution bus and second windings electrically coupled to the second AC distribution bus. The method still further comprises delivering power at the second AC voltage to a second plurality of loads, as shown at block 850, using the second AC distribution bus. Once again, this example method may be modified to accommodate any of the various configurations of the electric generation and distribution systems described herein.

Of course, it should be understood that the present invention is not limited by the foregoing description, nor is it limited by the accompanying drawings. Instead, the present invention is limited only by the following claims and their legal equivalents. With the above-described circuits, systems, methods, and other variations and extensions in mind, those skilled in the art will appreciate that the foregoing description and the accompanying drawings represent non-limiting examples of the systems and apparatus taught herein. As such, the present invention is not limited by the foregoing description and accompanying drawings. Instead, the present invention is limited only by the following claims and their legal equivalents.

What is claimed is:

1. An electric generation and distribution system, comprising:
   a prime mover configured for adjustable speed operation;
   a doubly-fed, asynchronous alternating-current (AC) induction generator driven by the prime mover and having a first poly-phase circuit and a second poly-phase circuit;
   a first AC distribution bus electrically coupled to the first poly-phase circuit and configured to deliver AC power at a first AC voltage to a first plurality of loads;
   a second AC distribution bus electrically coupled to the second poly-phase circuit and configured to deliver AC power at a second AC voltage to a second plurality of loads, the second AC voltage being lower than the first AC voltage;
   a poly-phase transformer having first windings electrically coupled to the first AC distribution bus and having second windings electrically coupled to the second AC distribution bus; and
   a poly-phase AC-to-AC electronic converter circuit electrically coupled between the second poly-phase circuit and the second AC distribution bus.

2. The electric generation and distribution system of claim 1, wherein the doubly-fed asynchronous AC generator is one of the following:

a wound-rotor induction generator with slip rings; and
a wound-rotor induction generator with brushless excitation.

3. The electric generation and distribution system of claim 1, wherein the AC-to-AC electronic converter circuit is an indirect converter.

4. The electric generation and distribution system of claim 1, wherein the AC-to-AC electronic converter circuit is configured to convert AC power between a variable-voltage, variable-frequency, AC voltage at the second poly-phase circuit and a substantially fixed frequency AC voltage at the second AC distribution bus.

5. The electric generation and distribution system of claim 1, further comprising:
a second prime mover configured for adjustable speed operation;
a second doubly-fed asynchronous alternating-current (AC) induction generator driven by the second prime mover and having a third poly-phase circuit electrically coupled to the first AC distribution bus and a fourth poly-phase circuit; and
a second poly-phase AC-to-AC converter circuit electrically coupled between the fourth poly-phase circuit and the second AC distribution bus.

6. A method of configuring an electric generation and distribution system, the method comprising:
configuring a prime mover for driving a doubly-fed asynchronous alternating current (AC) induction generator, the doubly-fed asynchronous AC induction generator having a first poly-phase circuit and a second poly-phase circuit;
electrically coupling a first AC distribution bus to the first poly-phase circuit and to a first plurality of loads, so as to deliver AC power at a first AC voltage to the first plurality of loads;
electrically coupling a second AC distribution bus to the second poly-phase circuit and to a second plurality of loads, so as to deliver AC power at a second AC voltage to the second plurality of loads;
electrically coupling first windings of a poly-phase transformer to the first AC distribution bus and electrically coupling second windings of the poly-phase transformer to the second AC distribution bus, so as to deliver AC power at a second AC voltage to the second AC distribution bus, the second AC voltage being lower than the first AC voltage; and
electrically coupling a poly-phase AC-to-AC electronic converter circuit between the second poly-phase circuit and the second AC distribution bus.

7. The method of claim 6, wherein the doubly-fed asynchronous AC generator is one of the following:
a wound-rotor induction generator with slip rings; and
a wound-rotor induction generator with brushless excitation.

8. The method of claim 6, wherein the AC-to-AC electronic converter circuit is an indirect converter.

9. The method of claim 6, wherein the AC-to-AC electronic converter circuit is configured to convert AC power between a variable-voltage, variable-frequency, AC voltage at the second poly-phase circuit and a substantially fixed frequency AC voltage at the second AC distribution bus.

10. The method of claim 6, further comprising:
configuring a second prime mover for driving a second doubly-fed asynchronous alternating current (AC) induction generator, the second doubly-fed asynchronous AC induction generator having a third poly-phase circuit and a fourth poly-phase circuit;
electrically coupling the third poly-phase circuit to the first AC distribution bus; and
electrically coupling a second poly-phase AC-to-AC converter circuit between the fourth poly-phase circuit and the second AC distribution bus.

11. A method of operating an electric generation and distribution system, the method comprising:
driving a doubly-fed asynchronous alternating current (AC) induction generator with a prime mover, the doubly-fed asynchronous AC induction generator having a first poly-phase circuit and a second poly-phase circuit;
coupling AC power from the first poly-phase circuit to a first AC distribution bus, without voltage conversion, and from the first AC distribution bus to a first plurality of loads, so as to deliver AC power at a first AC voltage to the first plurality of loads;
converting AC power from the second poly-phase circuit to a second AC voltage, using a poly-phase AC-to-AC electronic converter circuit, and coupling the second poly-phase circuit to a second AC distribution bus, wherein the second AC voltage is lower than the first AC voltage;
transforming AC power from the first poly-phase circuit to the second AC voltage, using a poly-phase transformer having first windings electrically coupled to the first AC distribution bus and second windings electrically coupled to the second AC distribution bus; and
delivering power at the second AC voltage to a second plurality of loads, using the second AC distribution bus.

12. The method of claim 11, wherein die doubly-fed asynchronous AC generator is one of the following:
a wound-rotor induction generator with slip rings; and
a wound rotor induction generator with brushless excitation.

13. The method of claim 11, wherein the AC-to-AC electronic converter circuit is an indirect converter.

14. The method of claim 11, wherein the AC-to-AC electronic converter circuit is configured to convert AC power between a variable-voltage, variable-frequency, AC voltage at the second poly-phase circuit to a substantially fixed frequency AC voltage at the second AC distribution bus.

15. The method of claim 11, further comprising:
driving a second doubly-fed asynchronous alternating current (AC) induction generator with a second prime mover, the second doubly-fed asynchronous AC induction generator having a third poly-phase circuit and a fourth poly-phase circuit;
coupling AC power from the third poly-phase circuit to the first AC distribution bus, without voltage conversion;
converting AC power from the fourth poly-phase circuit to the second AC voltage, using a second poly-phase AC-to-AC electronic converter circuit, and coupling the converted AC power to the second AC distribution bus.

* * * * *